(12) United States Patent
Wang et al.

(10) Patent No.: US 10,562,561 B2
(45) Date of Patent: Feb. 18, 2020

(54) ELECTRICAL POWER STEERING CONTROL USING SYSTEM STATE PREDICTIONS

(71) Applicant: STEERING SOLUTIONS IP HOLDING CORPORATION, Saginaw, MI (US)

(72) Inventors: Qi Wang, Novi, MI (US); Xingye Zhang, Saginaw, MI (US); Tejas M. Varunjikar, Rochester Hills, MI (US); Anthony J. Champagne, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 154 days.

(21) Appl. No.: 15/496,481

(22) Filed: Apr. 25, 2017

(65) Prior Publication Data
US 2017/0305458 A1 Oct. 26, 2017

Related U.S. Application Data

(60) Provisional application No. 62/327,085, filed on Apr. 25, 2016.

(51) Int. Cl.
*B62D 5/04* (2006.01)
*B60W 50/00* (2006.01)
*B62D 6/00* (2006.01)

(52) U.S. Cl.
CPC .......... *B62D 5/0463* (2013.01); *B60W 50/00* (2013.01); *B62D 6/001* (2013.01)

(58) Field of Classification Search
None
See application file for complete search history.

(56) References Cited

U.S. PATENT DOCUMENTS

| 4,315,117 A | 2/1982 | Kokubo et al. |
| 4,337,967 A | 7/1982 | Yoshida et al. |

(Continued)

FOREIGN PATENT DOCUMENTS

| CN | 1722030 A | 1/2006 |
| CN | 1736786 A | 2/2006 |

(Continued)

OTHER PUBLICATIONS

Yan et al., "EPS Control Technology Based on Road Surface Conditions", 2009, 2009 IEEE International Conference on Information and Automation, p. 933-938 (Year: 2009).*

(Continued)

*Primary Examiner* — Tamara L Weber

(57) ABSTRACT

An embodiment of a method of controlling one or more components of a vehicle includes receiving a reference steering command and one or more measurement signals related to a steering system of a vehicle, and estimating, by a processing device, a state of the steering system based on the one or more measurement signals, the steering system including at least a handwheel and a steering motor. The method also includes determining a maximum state achievable by the steering system at one or more times subsequent to receiving the one or more measurement signals, and controlling, by a control module, the steering system based on the steering reference command and the maximum state.

22 Claims, 16 Drawing Sheets

(56) References Cited

U.S. PATENT DOCUMENTS

| | | |
|---|---|---|
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asgari et al. |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,138,788 A | 10/2000 | Bohner et al. |
| 6,170,862 B1 | 1/2001 | Hoagland et al. |
| 6,212,453 B1 | 4/2001 | Kawagoe et al. |
| 6,227,571 B1 | 5/2001 | Sheng et al. |
| 6,256,561 B1 | 7/2001 | Asanuma |
| 6,301,534 B1 | 10/2001 | McDermott, Jr. et al. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,481,526 B1 | 11/2002 | Millsap et al. |
| 6,575,263 B2 | 6/2003 | Hjelsand et al. |
| 6,578,449 B1 | 6/2003 | Anspaugh et al. |
| 6,598,695 B1 | 7/2003 | Menjak et al. |
| 6,612,392 B2 | 9/2003 | Park et al. |
| 6,612,393 B2 | 9/2003 | Bohner et al. |
| 6,778,890 B2 | 8/2004 | Shimakage et al. |
| 6,799,654 B2 | 10/2004 | Menjak et al. |
| 6,817,437 B2 | 11/2004 | Magnus et al. |
| 6,819,990 B2 | 11/2004 | Ichinose |
| 6,820,713 B2 | 11/2004 | Menjak et al. |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,150,581 B2 | 4/2012 | Iwazaki et al. |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,452,492 B2 | 5/2013 | Buerkle et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,632,096 B1 | 1/2014 | Quinn et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,725,230 B2 | 5/2014 | Lisseman et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,915,164 B2 | 12/2014 | Moriyama |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,150,238 B2 | 10/2015 | Alcazar et al. |
| 9,159,221 B1 | 10/2015 | Stantchev |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,725,098 B2 | 8/2017 | Abou-Nasr et al. |
| 9,810,727 B2 | 11/2017 | Kandler et al. |
| 9,852,752 B1 | 12/2017 | Chou et al. |
| 9,868,449 B1 | 1/2018 | Holz et al. |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0182640 A1 | 9/2004 | Katou et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0155809 A1 | 7/2005 | Krzesicki et al. |
| 2005/0197746 A1 | 9/2005 | Pelchen et al. |
| 2005/0205344 A1* | 9/2005 | Uryu .................... B62D 5/046 180/446 |
| 2005/0275205 A1 | 12/2005 | Ahnafield |
| 2006/0224287 A1 | 10/2006 | Izawa et al. |
| 2006/0244251 A1 | 11/2006 | Muller |
| 2006/0271348 A1 | 11/2006 | Rossow et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |

(56) References Cited

U.S. PATENT DOCUMENTS

| | | | |
|---|---|---|---|
| 2008/0238068 A1 | 10/2008 | Kumar et al. | |
| 2009/0024278 A1 | 1/2009 | Kondo et al. | |
| 2009/0112406 A1* | 4/2009 | Fujii | B62D 5/0463 |
| | | | 701/42 |
| 2009/0189373 A1 | 7/2009 | Schramm et al. | |
| 2009/0256342 A1 | 10/2009 | Cymbal et al. | |
| 2009/0276111 A1 | 11/2009 | Wang et al. | |
| 2009/0292466 A1 | 11/2009 | McCarthy et al. | |
| 2010/0152952 A1 | 6/2010 | Lee et al. | |
| 2010/0222976 A1 | 9/2010 | Haug | |
| 2010/0228417 A1 | 9/2010 | Lee et al. | |
| 2010/0228438 A1 | 9/2010 | Buerkle | |
| 2010/0250081 A1 | 9/2010 | Kinser et al. | |
| 2010/0280713 A1 | 11/2010 | Stahlin et al. | |
| 2010/0286869 A1 | 11/2010 | Katch et al. | |
| 2010/0288567 A1 | 11/2010 | Bonne | |
| 2011/0098922 A1 | 4/2011 | Ibrahim | |
| 2011/0153160 A1 | 6/2011 | Hesseling et al. | |
| 2011/0167940 A1 | 7/2011 | Shavrnoch et al. | |
| 2011/0187518 A1 | 8/2011 | Strumolo et al. | |
| 2011/0224876 A1* | 9/2011 | Paholics | B62D 5/0463 |
| | | | 701/42 |
| 2011/0266396 A1 | 11/2011 | Abildgaard et al. | |
| 2011/0282550 A1 | 11/2011 | Tada et al. | |
| 2012/0136540 A1 | 5/2012 | Miller | |
| 2012/0150388 A1 | 6/2012 | Boissonnier et al. | |
| 2012/0197496 A1 | 8/2012 | Limpibunterng et al. | |
| 2012/0205183 A1 | 8/2012 | Rombold | |
| 2012/0209473 A1 | 8/2012 | Birsching et al. | |
| 2012/0215377 A1 | 8/2012 | Takemura et al. | |
| 2012/0296525 A1* | 11/2012 | Endo | B62D 5/0466 |
| | | | 701/42 |
| 2013/0002416 A1 | 1/2013 | Gazit | |
| 2013/0325202 A1 | 1/2013 | Howard et al. | |
| 2013/0087006 A1 | 4/2013 | Ohtsubo et al. | |
| 2013/0158771 A1 | 6/2013 | Kaufmann | |
| 2013/0218396 A1 | 8/2013 | Moshchuk et al. | |
| 2013/0233117 A1 | 9/2013 | Read et al. | |
| 2013/0253765 A1 | 9/2013 | Bolourchi et al. | |
| 2013/0292955 A1 | 11/2013 | Higgins et al. | |
| 2014/0028008 A1 | 1/2014 | Stadler et al. | |
| 2014/0046542 A1 | 2/2014 | Kauffman et al. | |
| 2014/0046547 A1 | 2/2014 | Kaufmann et al. | |
| 2014/0111324 A1 | 4/2014 | Lisseman et al. | |
| 2014/0300479 A1 | 4/2014 | Wolter et al. | |
| 2014/0152551 A1 | 6/2014 | Mueller et al. | |
| 2014/0156107 A1 | 6/2014 | Karasawa et al. | |
| 2014/0168061 A1 | 6/2014 | Kim | |
| 2014/0172231 A1 | 6/2014 | Terada et al. | |
| 2014/0277896 A1 | 9/2014 | Lathrop et al. | |
| 2014/0277945 A1 | 9/2014 | Chandy | |
| 2014/0309816 A1 | 10/2014 | Stefan et al. | |
| 2014/0354568 A1 | 12/2014 | Andrews et al. | |
| 2015/0002404 A1 | 1/2015 | Hooton | |
| 2015/0006033 A1 | 1/2015 | Sekiya | |
| 2015/0014086 A1 | 1/2015 | Eisenbarth | |
| 2015/0032322 A1 | 1/2015 | Wimmer | |
| 2015/0032334 A1 | 1/2015 | Jang | |
| 2015/0051780 A1 | 1/2015 | Hahne | |
| 2015/0120142 A1 | 1/2015 | Park et al. | |
| 2015/0210273 A1 | 2/2015 | Kaufmann et al. | |
| 2015/0060185 A1 | 3/2015 | Feguri | |
| 2015/0120141 A1 | 4/2015 | Lavoie et al. | |
| 2015/0246673 A1 | 4/2015 | Tseng et al. | |
| 2015/0123947 A1 | 5/2015 | Jubner et al. | |
| 2015/0251666 A1 | 7/2015 | Attard et al. | |
| 2015/0283998 A1 | 9/2015 | Lind et al. | |
| 2015/0324111 A1 | 9/2015 | Jubner et al. | |
| 2015/0314804 A1* | 11/2015 | Aoki | B62D 5/0484 |
| | | | 701/43 |
| 2015/0338849 A1 | 11/2015 | Nemec et al. | |
| 2016/0009332 A1 | 1/2016 | Sirbu | |
| 2016/0075371 A1 | 3/2016 | Varunkikar et al. | |
| 2016/0082867 A1 | 3/2016 | Sugioka et al. | |
| 2016/0200246 A1 | 3/2016 | Lisseman et al. | |
| 2016/0185387 A1 | 6/2016 | Kuoch | |
| 2016/0200343 A1 | 6/2016 | Lisseman et al. | |
| 2016/0200344 A1 | 7/2016 | Sugioka et al. | |
| 2016/0207538 A1 | 7/2016 | Urano et al. | |
| 2016/0209841 A1 | 7/2016 | Yamaoka et al. | |
| 2016/0229450 A1 | 7/2016 | Basting et al. | |
| 2016/0231743 A1 | 7/2016 | Bendewald et al. | |
| 2016/0347347 A1 | 8/2016 | Lubischer | |
| 2016/0347348 A1 | 8/2016 | Lubischer | |
| 2016/0291862 A1 | 10/2016 | Yaron et al. | |
| 2016/0318540 A1 | 11/2016 | King | |
| 2016/0318542 A1 | 11/2016 | Pattok et al. | |
| 2016/0355207 A1 | 12/2016 | Urushibata | |
| 2016/0362084 A1 | 12/2016 | Martin et al. | |
| 2016/0362117 A1 | 12/2016 | Kaufmann et al. | |
| 2016/0362126 A1 | 12/2016 | Lubischer | |
| 2016/0364003 A1 | 12/2016 | O'Brien | |
| 2016/0368522 A1 | 12/2016 | Lubischer | |
| 2016/0375860 A1 | 12/2016 | Lubischer | |
| 2016/0375923 A1 | 12/2016 | Schulz | |
| 2016/0375925 A1 | 12/2016 | Lubischer et al. | |
| 2016/0375926 A1 | 12/2016 | Lubischer et al. | |
| 2016/0375927 A1 | 12/2016 | Schulz et al. | |
| 2016/0375928 A1 | 12/2016 | Magnus | |
| 2016/0375929 A1 | 12/2016 | Rouleau | |
| 2016/0375931 A1 | 12/2016 | Lubischer | |
| 2017/0029009 A1 | 2/2017 | Rouleau | |
| 2017/0029018 A1 | 2/2017 | Lubischer | |
| 2017/0113712 A1 | 4/2017 | Watz | |
| 2017/0151978 A1 | 6/2017 | Oya et al. | |
| 2017/0158055 A1 | 6/2017 | Kim et al. | |
| 2017/0158222 A1 | 6/2017 | Schulz et al. | |
| 2017/0203785 A1* | 7/2017 | Naik | B62D 5/0463 |
| 2017/0225704 A1 | 8/2017 | Urushibata | |
| 2017/0240204 A1 | 8/2017 | Raad et al. | |
| 2017/0274929 A1* | 9/2017 | Sasaki | B62D 5/04 |
| 2017/0293306 A1 | 10/2017 | Riefe et al. | |
| 2017/0297606 A1 | 10/2017 | Kim et al. | |
| 2018/0029632 A1 | 2/2018 | Bodtker et al. | |
| 2018/0072341 A1 | 3/2018 | Schulz et al. | |
| 2018/0093700 A1 | 4/2018 | Chandy | |
| 2018/0105198 A1 | 4/2018 | Bodtker et al. | |
| 2018/0107214 A1 | 4/2018 | Chandy | |
| 2018/0136727 A1 | 5/2018 | Chandy | |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102320324 A | 1/2012 |
| CN | 102452391 A | 5/2012 |
| CN | 202563346 U | 11/2012 |
| CN | 103158699 A | 6/2013 |
| CN | 103419840 A2 | 12/2013 |
| CN | 103448785 A | 12/2013 |
| CN | 103677253 A | 3/2014 |
| CN | 104024084 A | 9/2014 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102012010887 A1 | 12/2013 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 A | 8/1985 |
| JP | S60164629 A | 8/1985 |

(56) References Cited

FOREIGN PATENT DOCUMENTS

| | | |
|---|---|---|
| JP | H05162652 A | 6/1993 |
| JP | 2007253809 A | 10/2007 |
| JP | 20174099 A | 1/2017 |
| KR | 20100063433 A | 6/2010 |
| WO | 2006099483 A1 | 9/2006 |
| WO | 2007034567 A1 | 3/2007 |
| WO | 2010082394 A1 | 7/2010 |
| WO | 2010116518 A1 | 10/2010 |
| WO | 2013080774 A1 | 6/2013 |
| WO | 2013101058 A1 | 7/2013 |

OTHER PUBLICATIONS

Gillespie, Thomas D.; "FUndamentals of Vehicla Dynamics"; Society of Automotive Engineers, Inc.; published 1992; 294 pages.

Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.

Varunjikar, Tejas; Design of Horizontal Curves With DownGrades Using Low-Order Vehicle Dynamics Models; A Theisis by T. Varunkikar; 2011; 141 pages.

Van Der Jagt, Pim; "Prediction of steering efforts during stationary or slow rolling parking maneuvers"; Jul. 2013, 20 pages.

CN Patent Application No. 201210599006.6 First Office Action dated Jan. 27, 2015, 9 pages.

CN Patent Application No. 201210599006.6 Second Office Action dated Aug. 5, 2015, 5 pages.

CN Patent Application No. 201310178012.9 First Office Action dated Apr. 13, 2015, 13 pages.

EP Application No. 14156903.8 Extended European Search Report, dated Jan. 27, 2015, 10 pages.

EP Application No. 14156903.8 Office Action dated May 31, 2016, 5 pages.

EP Application No. 14156903.8 Partial European Search Report dated Sep. 23, 2014, 6 pages.

European Application No. 12196665.9 Extended European Search Report dated Mar. 6, 2013, 7 pages.

European Search Report for European Application No. 13159950.8; dated Jun. 6, 2013; 7 pages.

European Search Report for related European Application No. 15152834.6, dated Oct. 8, 2015; 7 pages.

CN Patent Application No. 201310178012.9 Second Office Action dated Dec. 28, 2015, 11 pages.

China Patent Application No. 201510204221.5 Second Office Action dated Mar. 10, 2017, 8 pages.

EP Application No. 14156903.8 Office Action dated Nov. 16, 2015, 4 pages.

CN Patent Application No. 201410089167 First Office Action and Search Report dated Feb. 3, 2016, 9 pages.

Chinese First Office Action and Search Report dated Dec. 20, 2017 cited in Application No. 2016103666609.X, (w/ English language translation), 16 pgs.

Chinese First Office Action dated Jan. 22, 2018 cited in Application No. 201610575225.9, (w/ English language translation), 16 pgs.

Chinese Office Action and Search Report dated Mar. 22, 2018 cited in Application No. 201610832736.4, (w/ English language translation) 12 pgs.

* cited by examiner

ELECTRICAL POWER STEERING CONTROL USING SYSTEM STATE PREDICTIONS

CROSS-REFERENCES TO RELATED APPLICATIONS

This patent application claims priority to U.S. Provisional Patent Application Ser. No. 62/327,085, filed Apr. 25, 2016 which is incorporated herein by reference in its entirety.

BACKGROUND OF THE INVENTION

The present invention relates to methods and systems of a steering system, and more particularly to methods and system for forecasting or predicting system states and controlling aspects of a vehicle and/or steering system based on the predicted system states.

Electrical power steering (EPS) systems use an electric motor as an actuator to provide assist to a driver while steering a vehicle. In today's market, automotive technology is evolving fast to embrace semi-autonomous and autonomous technologies by developing feasible ADAS (Advanced Driver Assistance Systems) solutions. Instead of directly assisting the driver (by reducing steering efforts), EPS can also accept a position command from another control system to achieve directional control of a vehicle in certain conditions.

SUMMARY OF THE INVENTION

An embodiment of a method of controlling one or more components of a vehicle includes receiving a reference steering command and one or more measurement signals related to a steering system of a vehicle, and estimating, by a processing device, a state of the steering system based on the one or more measurement signals, the steering system including at least a handwheel and a steering motor. The method also includes determining a maximum state achievable by the steering system at one or more times subsequent to receiving the one or more measurement signals, and controlling, by a control module, the steering system based on the steering reference command and the maximum state.

An embodiment of a control system includes a processing device configured to estimate a state of a steering system of a vehicle based on measurement signals relating to the steering system and the vehicle, the measurement signals associated with an initial time interval, the steering system including at least a handwheel and a steering motor, and determine a maximum state achievable by the steering system at one or more subsequent time intervals. The system also includes a control module configured to control at least one of the steering system and the vehicle based on the maximum state.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
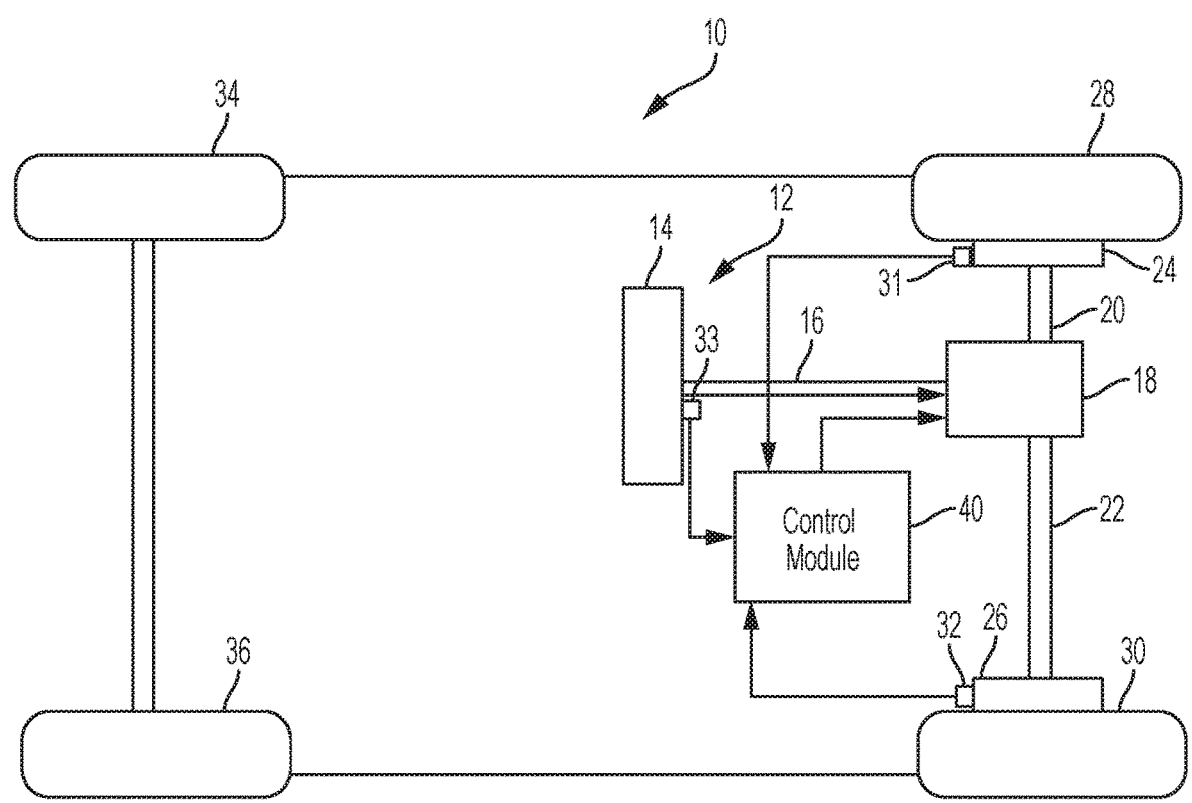
FIG. 1 is a functional block diagram illustrating a vehicle including a steering control and/or assistance system in accordance with an exemplary embodiment of the invention.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 such as an electrical power steering (EPS) and/or driver assistance system is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a steering actuator motor (e.g., electrical motor) and a rack and pinion steering mechanism (not shown) that may be coupled through the steering shaft 16 to the steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors that measure signals of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. The sensors 31, 32 generate wheel speed signals based thereon. In other examples, other wheel speed sensors can be provided in addition to or alternative to the sensors 31 and 32. The other wheel speed sensors may sense a rotational speed of rear wheels 34, 36 and generate sensor signals based thereon. As can be appreciated, other wheel sensors that sense wheel movement, such as wheel position sensors, may be used in place of the wheel speed sensors. In such a case, a wheel velocity and/or vehicle velocity or speed may be calculated based on the wheel sensor signal. In another example, the sensor 33 is a torque sensor that senses a torque placed on the handwheel 14. The sensor 33 generates torque signals based thereon. Other sensors include sensors for detecting the position (motor position/angle) and rotational speed (motor velocity or motor speed) of the steering actuator motor or other motor associated with the steering assist unit 18.

A control module 40 controls the operation of the steering system 12 based on one or more of the sensor signals and further based on the steering control systems and methods of the present disclosure. The control module may be used as part of an EPS system to provide steering assist torque and/or may be used as a driver assistance system that can control steering of the vehicle (e.g., for parking assist, emergency steering control and/or autonomous or semi-autonomous steering control). An example of a driver assistance system is an ADAS (Advanced Driver Assistance Systems) system that, instead of or in addition to directly assisting the driver (by reducing steering efforts), can also accept a position command from another control system to achieve directional control of a vehicle in certain conditions.

Generally speaking, the steering control systems and methods of the present disclosure can be used to provide directional control of a vehicle (either autonomously, semi-autonomously or by providing torque or steering assist) based on forecasting or predicting future system states. Such predictions can be used to assist in achieving a desired heading (or tire position) within a required time under various conditions. For example, a steering control system can provide steering control and/or assistance in functions such as automated driving and/or automatic parking assist (APA).

Aspects of embodiments described herein may be performed by any suitable control system and/or processing device, such as the motor assist unit 18 and/or the control module 40. In one embodiment, the control module 40 is or is included as part of an autonomous driving system.

Figure 2:
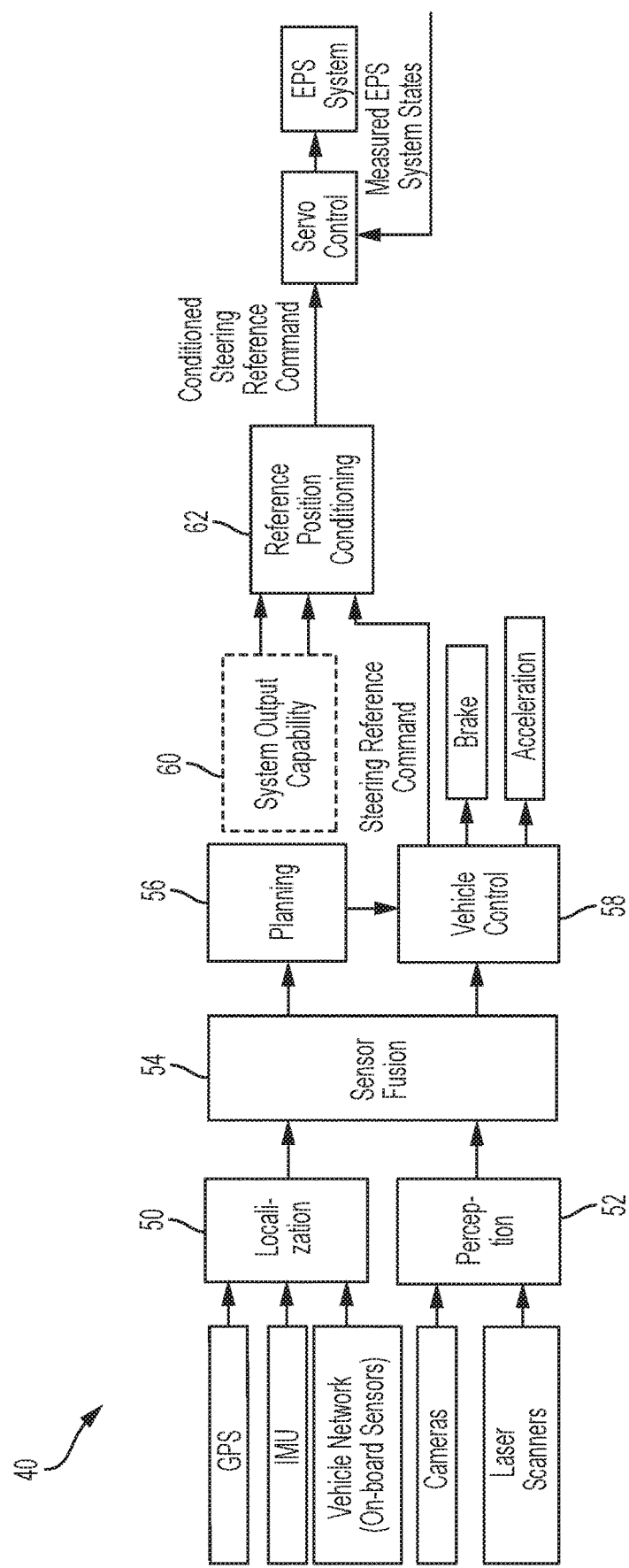
FIG. 2 is a schematic illustrating components, modules and functions of a steering control and/or assistance system in accordance with another exemplary embodiment of the invention.

Referring now to FIG. 2, a dataflow diagram illustrates an exemplary embodiment of a control device or system such as the control module 40 of FIG. 1 used to control the steering system 12 of FIG. 1. In various embodiments, the control device or system (e.g., the module 40) can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. Inputs to the control module 40 can be generated from sensors such as the sensors 31, 32, 33 (FIG. 1) of the vehicle 10 (FIG. 1), can be received from other control modules (not shown) within the vehicle 10 (FIG. 1), can be modeled, and/or can be predefined.

The control module 40 may primarily include sub-modules such as a System Output Capability module 60, a reference command conditioning module 62 and a servo control module that outputs motor torque commands to an EPS or other steering control system. The control module may also incorporate additional sub-modules such as those shown in FIG. 2 and discussed further below.

In the example of FIG. 2, the control module 40 includes various sub-modules such as a localization module 50 that receives location information from devices such as a global positioning system (GPS) device, inertial measurement unit (IMU) and/or a vehicle network. A perception module 52 receives information such as camera and laser scanner data. A sensor fusion module 54 combines results from the localization and perception modules, which can be used by a planning module 56 and/or a vehicle control module 58 that makes control decisions. The control decisions, in one embodiment, include generating a reference command, such as a reference motor torque command that prescribes an amount of torque to be applied by a steering actuator motor and/or a reference handwheel position to which a vehicle handwheel is to be positioned using the motor.

The control module 40 also includes a system output capability module 60 that can estimate current system states and/or forecast future system states, and can estimate current system capabilities and/or forecast future system capabilities. The system capability estimations can include maximum states (e.g., maximum handwheel position, maximum motor torque, etc.), and can provide information as to whether a commanded state can be achieved and the amount of time required to achieve the commanded state. The system output capability module 60 uses EPS signals (e.g., motor velocity and motor position), vehicle signals (e.g., vehicle speed) and/or motor capability data to estimate and/or forecast system states.

A system state may be one or more of various states related to, e.g., handwheel position and motor parameters (e.g., torque, motor angular speed, etc.). For example, the output capability module 60 can function as a handwheel position forecasting module that performs a handwheel position forecasting function. In another example, the module can estimate a maximum motor torque, e.g., the maximum amount of torque that can be generated by a motor. In yet another example, the module 60 can estimate an amount of motor torque that can be achieved within a selected time interval (i.e., time step), and/or can estimate an amount of time required to achieve a selected handwheel position.

The vehicle control module 58 is used to generate a steering reference command (e.g., a motor torque command, a reference steering angle or a reference handwheel position) based on information from perception module 52 and the localization module 50, however the state specified by the steering reference command may not be reached in the required time due to the limited ability of the steering motor. The output capability module 60 is able to forecast system states (e.g., the maximum steering angle or motor torque) that can be achieved by or within a selected time interval, e.g., within a calibrate-able time into the future. The output from the output capability module 60 may be used to condition control signals and can also be used to define the slew rate of the reference handwheel angle. For example, the output capability module 60 performs a handwheel position forecasting function and is configured to generate a predicted handwheel position in the clockwise direction and a predicted handwheel position in the counterclockwise direction, which can be used as maximums to limit the reference handwheel position and/or other control commands. The system output capability can be input to a reference command conditioning module 62 that conditions or limits the reference command to stay within system capability limits.

Figure 3:
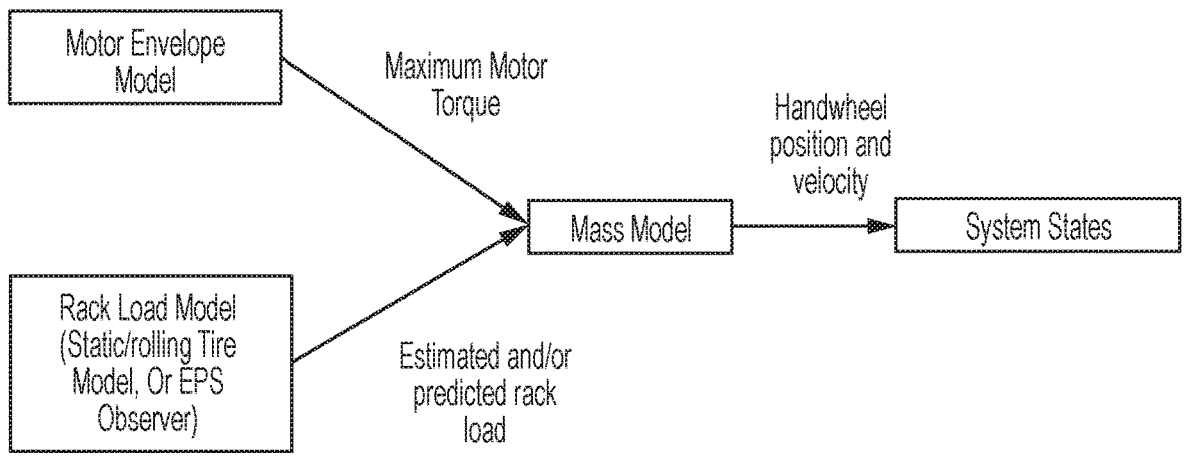
FIG. 3 is a functional block diagram illustrating aspects of estimating and/or forecasting system states.

FIG. 3 is a block diagram that illustrates aspects of embodiments of a system state estimation and/or forecasting method that can be performed in conjunction with a vehicle control system (e.g., an EPS system or autonomous steering system). In one embodiment, the method includes estimating and/or forecasting a rack load based on system information such as vehicle speed, motor position and motor velocity (angular velocity). Rack load refers to an amount of load or equivalent torque acting on a rack in a steering system due to tire forces. The rack load can be input to a mass model of a steering system, such as a one-mass or two-mass model. Current and/or future system states can be estimated based on the rack load and the mass model. In one embodiment, a motor envelope model is incorporated into the method, which estimates limits on motor capability based on factors such as voltage limits and thermal limits. The method estimates one or more system states such as handwheel position, maximum achievable handwheel velocity and motor torque.

Figure 4:
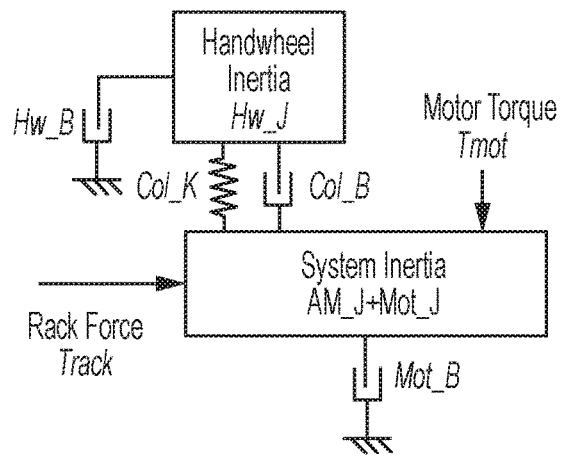
FIG. 4 depicts an embodiment of a two-mass model.

FIG. 4 shows an example of the mass model. In this example, the model is a two-mass model of the control system, which is a two degree of freedom mass-spring-damping system. A system identification process may be used to determine the parameters in this model.

Figure 5:
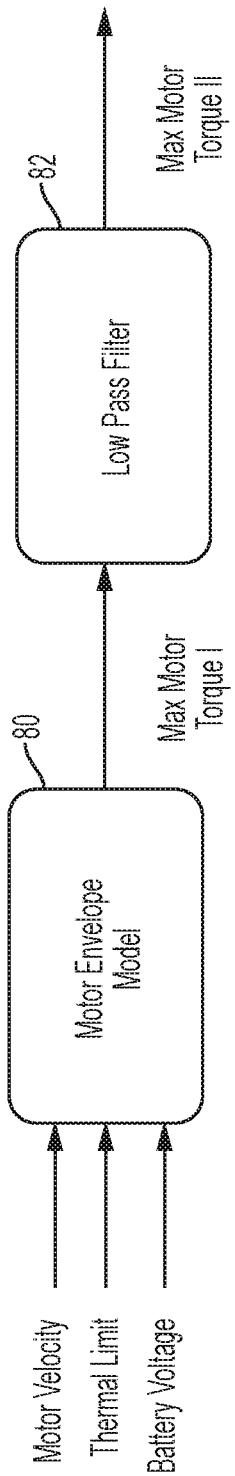
FIG. 5 depicts an embodiment of a motor envelope model.

FIG. 5 illustrates aspects of an embodiment of estimating or predicting motor capability limits such as maximum motor torque, which incorporates a motor envelope model 80. In this embodiment, measured motor speed or velocity values are input to the model, and additional information including a thermal limit and a battery voltage measurement can also be input to the model 80. The motor envelope model 80 can calculate the maximum motor torque command, depending on the motor velocity, thermal limit, and battery voltage. The thermal limit is provided to indicate the maximum motor torque that can generated by the motor, and can be provided as a maximum temperature or a maximum motor torque (e.g., in units of motor newton-meters) calculated by another module. The thermal limit depends on temperature and motor velocity, and is provided to protect the motor from excessive use.

The maximum motor torque (shown as Max Motor Torque I) can be input to a low pass filter (LPF) 82, which models and further limits the maximum torque based on the dynamic behavior of the motor and motor control.

Figure 6:
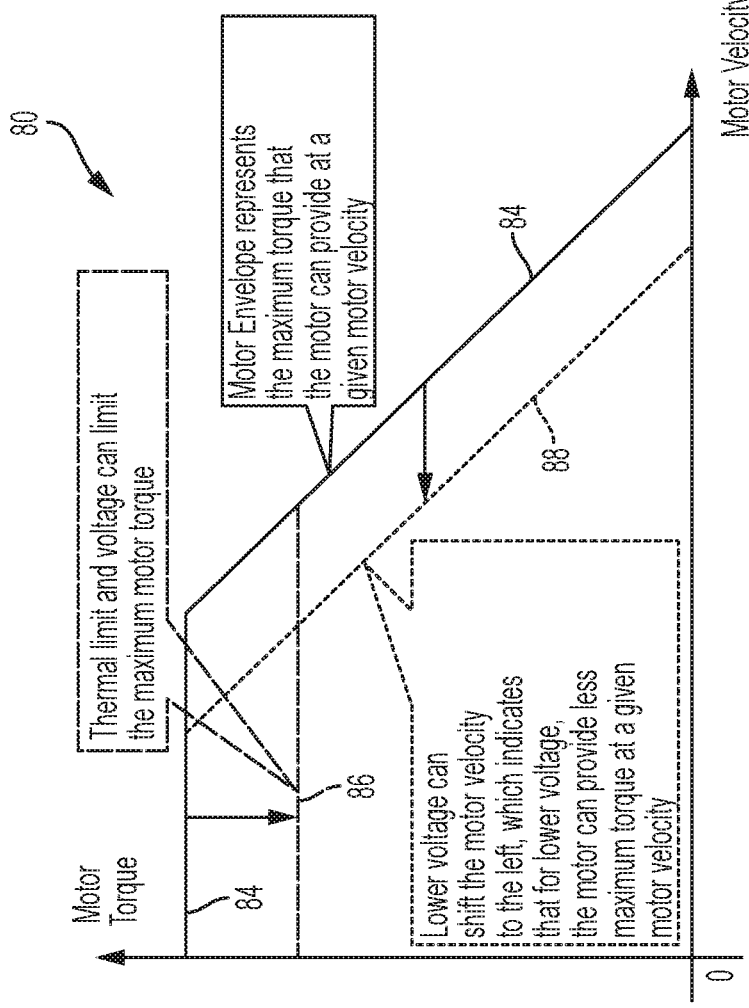
FIG. 6 is a graph depicting an embodiment of the motor envelope model of FIG. 5, including various limits on motor torque.

As shown above, the motor envelope model 80 estimates the maximum torque and limits the motor torque command, based on factors including motor velocity, thermal limit, and voltage. FIG. 6 illustrates an embodiment of the motor envelope model that includes various limits on motor capability and shows the relationships among motor torque, motor velocity, thermal limit, and voltage. In this embodiment, the motor envelope model 80 estimates limits including a maximum motor torque limit 84 that represents the maximum torque that can be provided at a given motor velocity. A thermal and voltage limit 86 can further limit the motor torque at a given motor velocity based on thermal and voltage limits. As shown by a modified motor torque limit 88, lower voltage can shift the motor velocity to the left, which indicates that for lower voltages, the motor can provide less maximum torque at a given motor velocity.

It is noted that the motor envelope model can be configured to account for fewer factors or different factors than those discussed in conjunction with FIGS. 5 and 6. For example, the motor torque envelope model can be simplified to account for motor velocity without the other factors.

As discussed above, the system state estimation and/or forecasting method may include estimating and/or predicting a rack load, which can then be applied to a mass model of the steering system for estimation and/or prediction of system states. The estimated or predicted rack load can be determined using a number of techniques. One technique includes estimating rack force based on motor measurements (motor angle, motor speed) using a state observer that provides estimates of the internal state of the system, such as an EPS observer.

Figure 7:
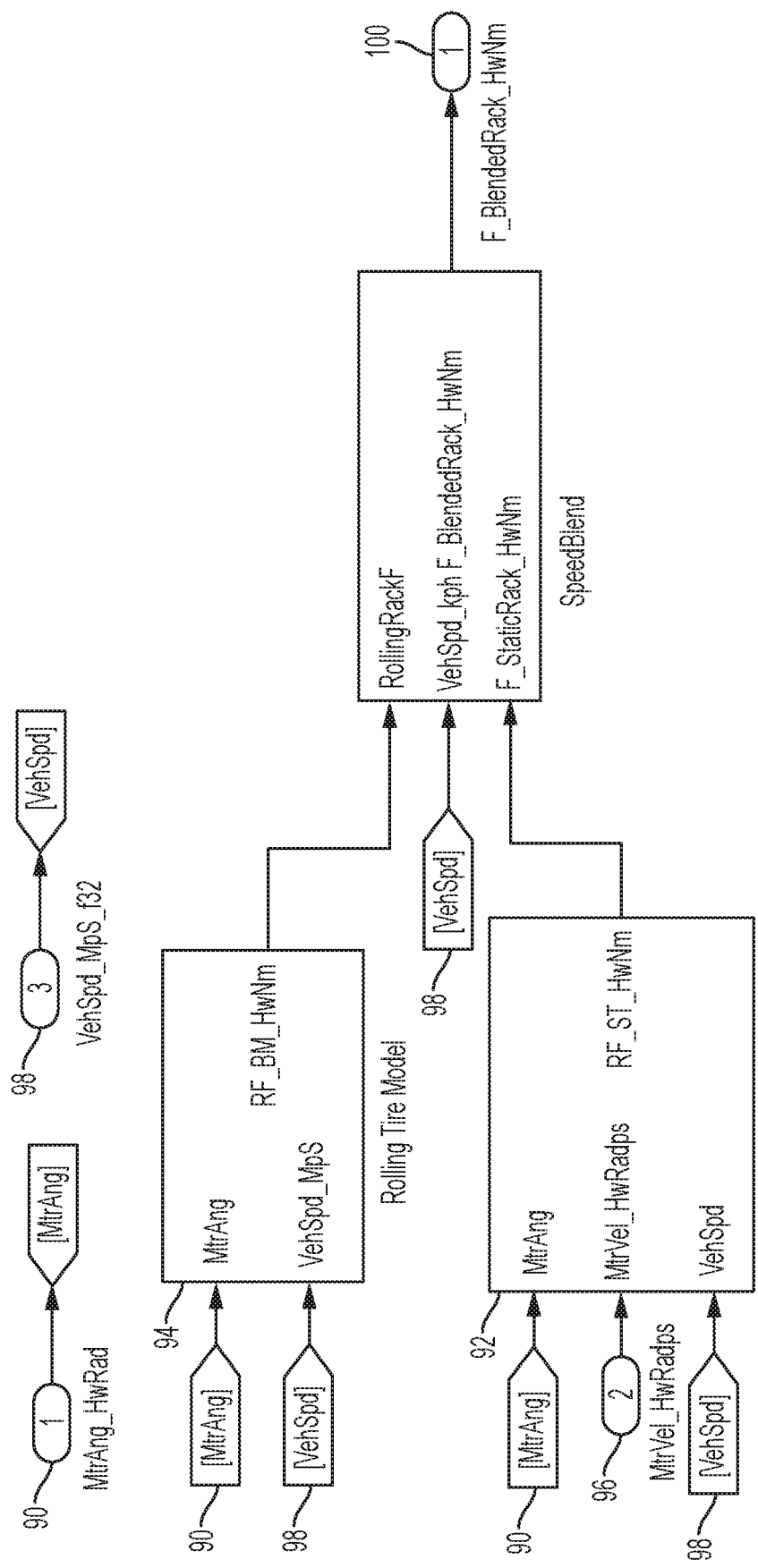
FIG. 7 depicts aspects of a method of estimating rack load based on a combined tire model.

Referring to FIG. 7, in one embodiment, the rack load is estimated using a tire model structure. In this embodiment, measurement information including motor angle 90 is input to a static tire model 92 and a rolling tire model 94. The static tire model predicts the rack torque based on motor position (motor angle 90), motor velocity 96 and vehicle speed 98. The rolling tire model 94 uses a nonlinear bicycle model to predict rack torque. The rolling tire model 94 outputs a rolling rack force and the static tire model 92 outputs a static rack force, which can be combined or blended as a function of vehicle speed to produce a blended rack force 100.

Figure 8:
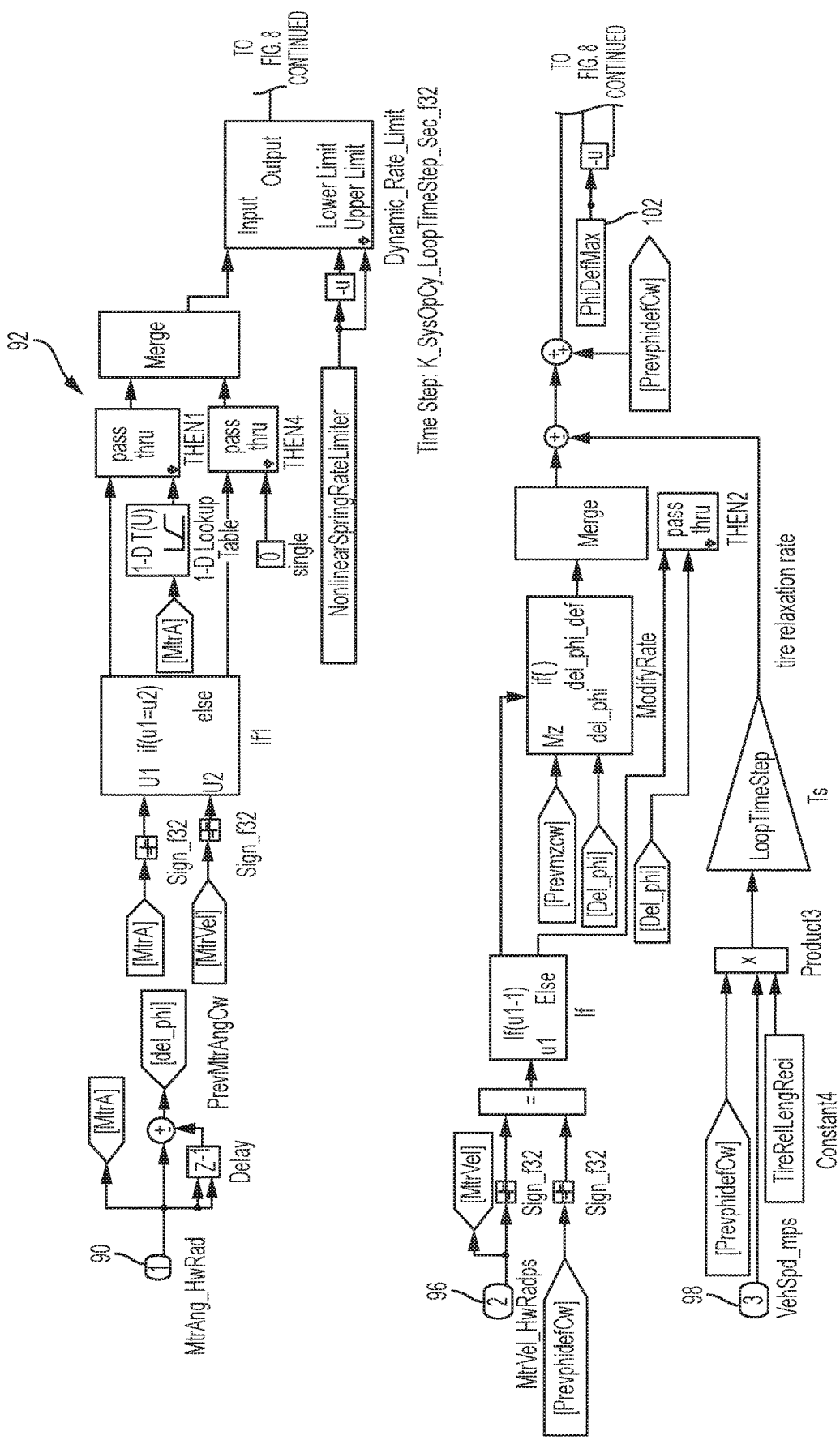
FIG. 8 depicts the method of FIG. 7, including aspects of a static tire model.
Figure 8:
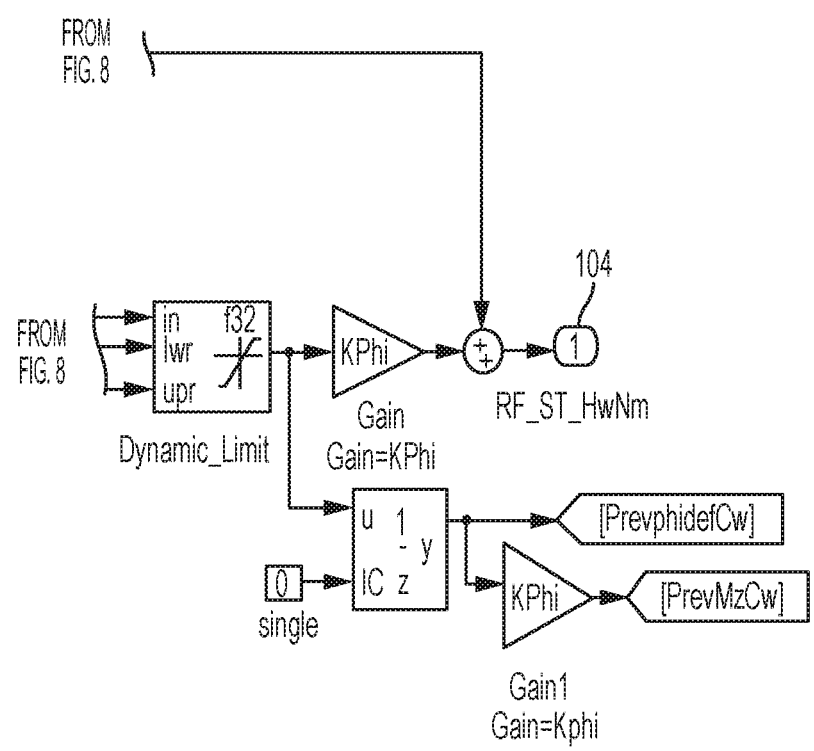

Referring to FIG. 8, an embodiment of the static tire model incorporates the following equations:

$$M_z = K_\psi \Psi,$$

where $M_z$ is the aligning torque, $K_\psi$ is the torsional stiffness of the tire, and $\Psi$ is the yaw angle of the wheel plane, and $$\Psi_{def} = \left(1 - \left|\frac{M_\tau}{M_{zmax}}\right|\right) \cdot \Psi \quad \text{if } \operatorname{sign}(\Psi_{def}) = \operatorname{sign}(\Psi)$$

$$\Psi_{def} = \Psi \quad \text{if } \operatorname{sign}(\Psi_{def}) \neq \operatorname{sign}(\Psi)$$

$$\Psi_{defn} = M_{zmax}/K_\psi$$

$$\Psi_{def} = \int_0^t \dot\Psi_{def} \cdot \partial t$$

$$M_z = K_\psi \cdot \Psi_{def}$$

with $\Psi_{def}$: Torsional deflection of the tire.
$\Psi_{deflux}$: Maximum possible deflection of the tire.
$M_{z\ max}$: Maximum Torque that can be generated by the tire.

$$\Psi_{def2} = -\frac{1}{\tau} \cdot \Psi_{def}$$

-continued $$\tau = X_{rel}/(\omega \cdot r)$$

$$\Psi_{def} = \int_0^t (\Psi_{def} + \Psi_{def2}) \cdot \partial t$$

with

Xrel: Tire relaxation length.

ω: Tire rotational velocity.

r: Tire rolling radius.

An example of the static tire model is described in U.S. patent application Ser. No. 14/486,392 entitled "Providing Assist Torque without Hand Wheel Torque Sensor for Zero to Low Speed," filed on Sep. 15, 2014, the entirety of which is incorporated herein by reference. The above equations are implemented in steering wheel coordinates (HW rad, HW rad/s), rather than tire steering coordinates (tire rad, tire rad/s).

In addition, as shown in FIG., motor velocity 96, motor angle 90 and a constant 102 ($\Psi_{defin}$) are input to the static tire model 92 to generate a static rack force value 104.

Figure 9:
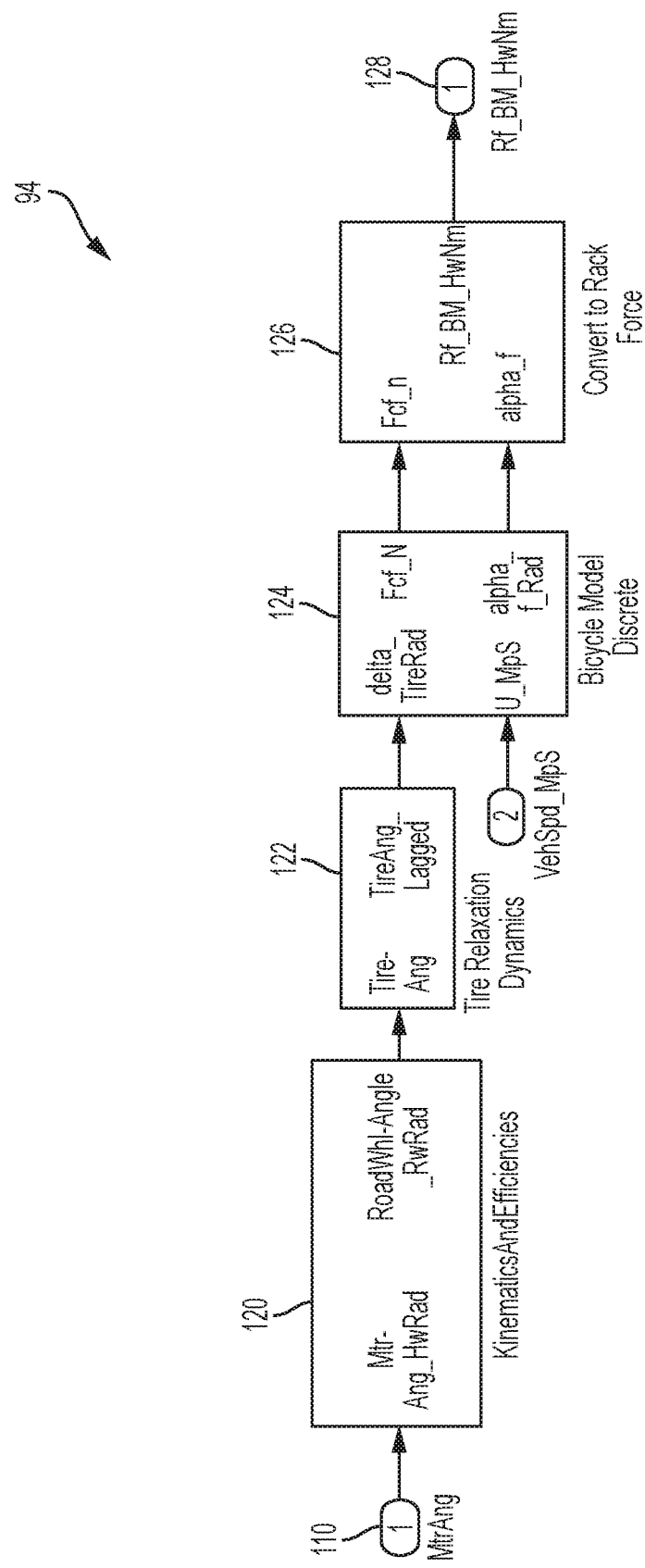
FIG. 9 depicts the method of FIG. 7, including aspects of a rolling tire model.

Referring to FIG. 9, an embodiment of the rolling tire model 94 is based on a nonlinear bicycle model with some modifications. An example of the rolling tire model is described in U.S. patent application Ser. No. 15/077,591 entitled "Continuous Estimation of Surface Friction Coefficient based on EPS and Vehicle Models," filed on Mar. 22, 2016, the entirety of which is incorporated herein by reference.

The motor angle value 90 is input to a tire relaxation dynamics module 120, which converts the motor angle to a tire angle using road wheel angle measurements and steer arm length measurements. This predicted road-wheel angle is passed through a vehicle speed dependent low pass filter. Steer arm length can be found using measurements done on a vehicle. The road wheel angle is applied to a tire relaxation dynamics module 122 and then to a bicycle model 124, which receives the road wheel angle and a vehicle speed value, and calculates force functions and values (alpha) related to tire slip between the tires and the road. At block 126, outputs from the bicycle model 124, the steer arm length and vehicle speed are used to calculate a rolling rack force 128.

Standard force and moment balance equations can be used at the front and rear axles of the bicycle model 124. The nonlinear rolling tire model is used to represent the lateral force vs slip angle relationship.

The following equations may be used in the rolling tire model:

$$m(\dot{V}+rU)=F_{cf}+F_{cr}$$

$$I_{zz}\dot{r}=a \cdot F_{cf}-b \cdot F_{cr}$$

where:

V=Lateral speed of center of gravity (CG) of vehicle
U=Longitudinal speed of CG of vehicle
r=Yaw Rate of CG of vehicle
a=Distance of front axle from CG of vehicle
b=Distance of rear axle from CG of vehicle
$I_{zz}$=Moment of Inertia about z axis
$F_{cf}$=Tire force of front axle
$F_{cr}$=Tire force of rear axle
m=Mass of vehicle.

$F_{cf}$ and $F_{cr}$ may be determined by a look-up table with the inputs of vehicle speed and slip angle. The higher vehicle speed will lead to a lower lateral force.

The relationship between slip angle and lateral force may be represented by $$\alpha_f = \frac{V+ar}{U} - \delta$$

$$\alpha_r = \frac{V-br}{U}$$

where $\alpha_f$ and $\alpha_r$ are slip angles of front and rear axles respectively, and δ is the steer angle (tire angle). The axle forces and pneumatic trail are expressed as:

$$F_{cf}=F_{cf}(\alpha_f)$$

$$F_{cr}=F_{cr}(\alpha_r)$$

Rack Force: $F_{rack}=(t_m-t_p) \cdot F_{cf}/SA$

SA: Steer Arm Length
a: Vehicle CG to Front Axle Distance
b: Vehicle CG to Rear Axle Distance
$\alpha_f$: Front Axle Slip Angle
$\alpha_r$: Rear Axle Slip Angle
$t_m$: Mechanical Trail
$t_p$: Pneumatic Trail In one embodiment, the static rack force 104 and the rolling rack force 128 are blended based on vehicle speed to generate a blended rack force 130. For example, the static rack force and the rolling rack force can be weighted based on vehicle speed, and/or a threshold speed can be applied to determine which force is output.

Figure 10:
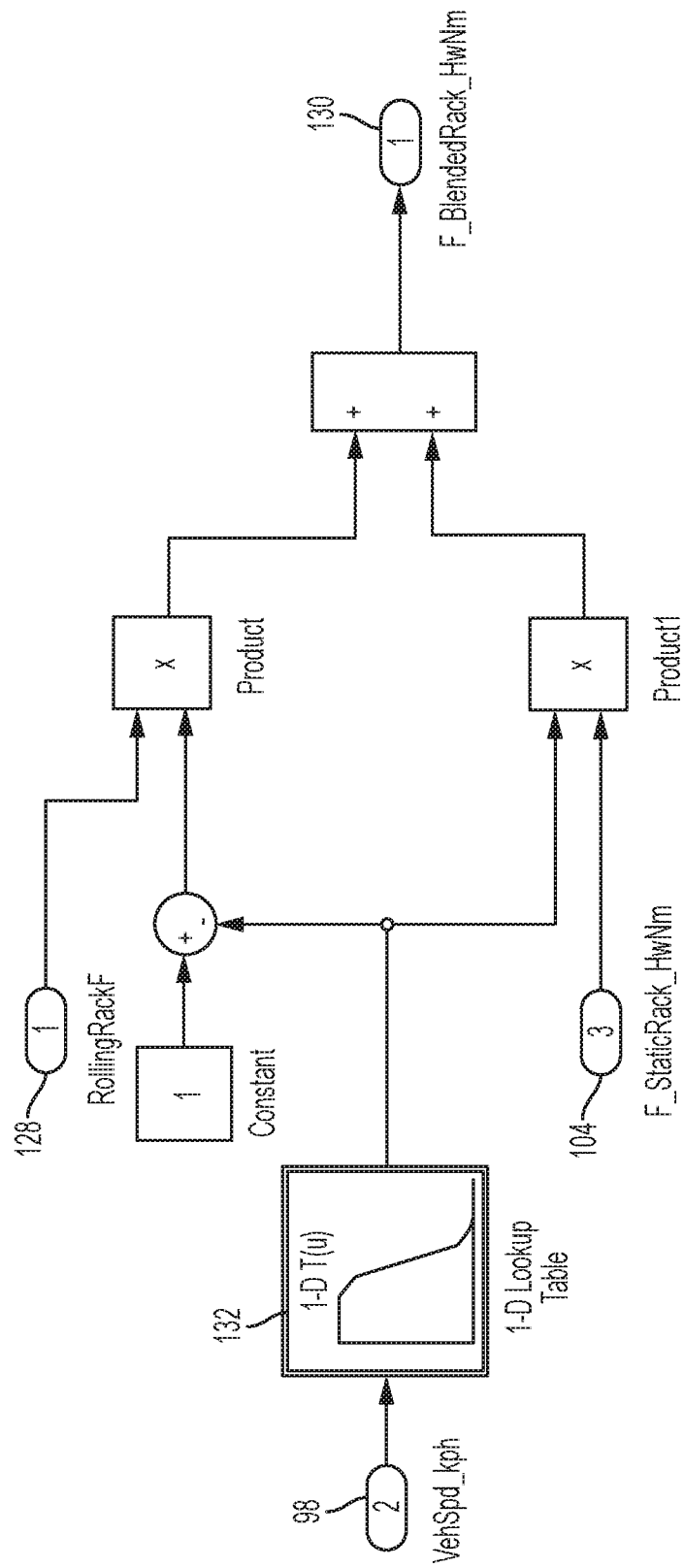
FIG. 10 depicts an example of an algorithm for blending or combining outputs from the rolling tire model and the static tire model of FIG. 7.

FIG. 10 shows an example of a speed blending algorithm. A vehicle speed value 98 is normalized and input to a lookup table 132, which calculates a value (e.g., between zero and one) based on vehicle speed and is used to combine the rolling rack force 128 and the static rack force 104. The value is added to a constant and multiplied by the rolling rack force 128, and is also multiplied by the static rack force 104. The resulting values are added to generate the blended rack force 130.

Data including the blended rack force and the maximum motor torque (which may be generated using the motor envelope model) can be applied to a mass model of an EPS or other control system. The mass model may be a one-mass model (e.g., a one degree of freedom mass-spring-damping system), a two-mass model, or other formulation. There may be various formulations of EPS or control system dynamics, such as a three-mass model or even a ten-mass model. The parameters of a multi-body EPS system model may be derived using system identification methods.

Figure 11:
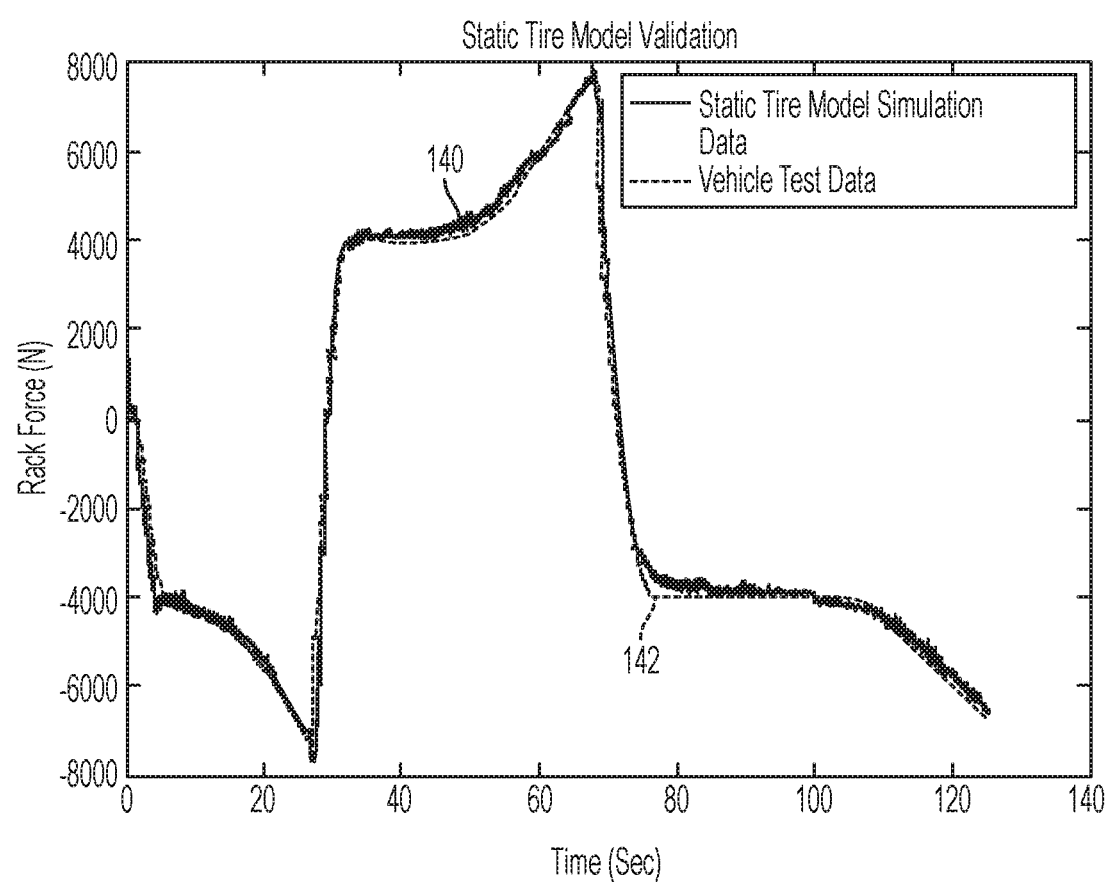
FIG. 11 depicts an example of simulation results based on a static tire model according to embodiments described herein.
Figure 12:
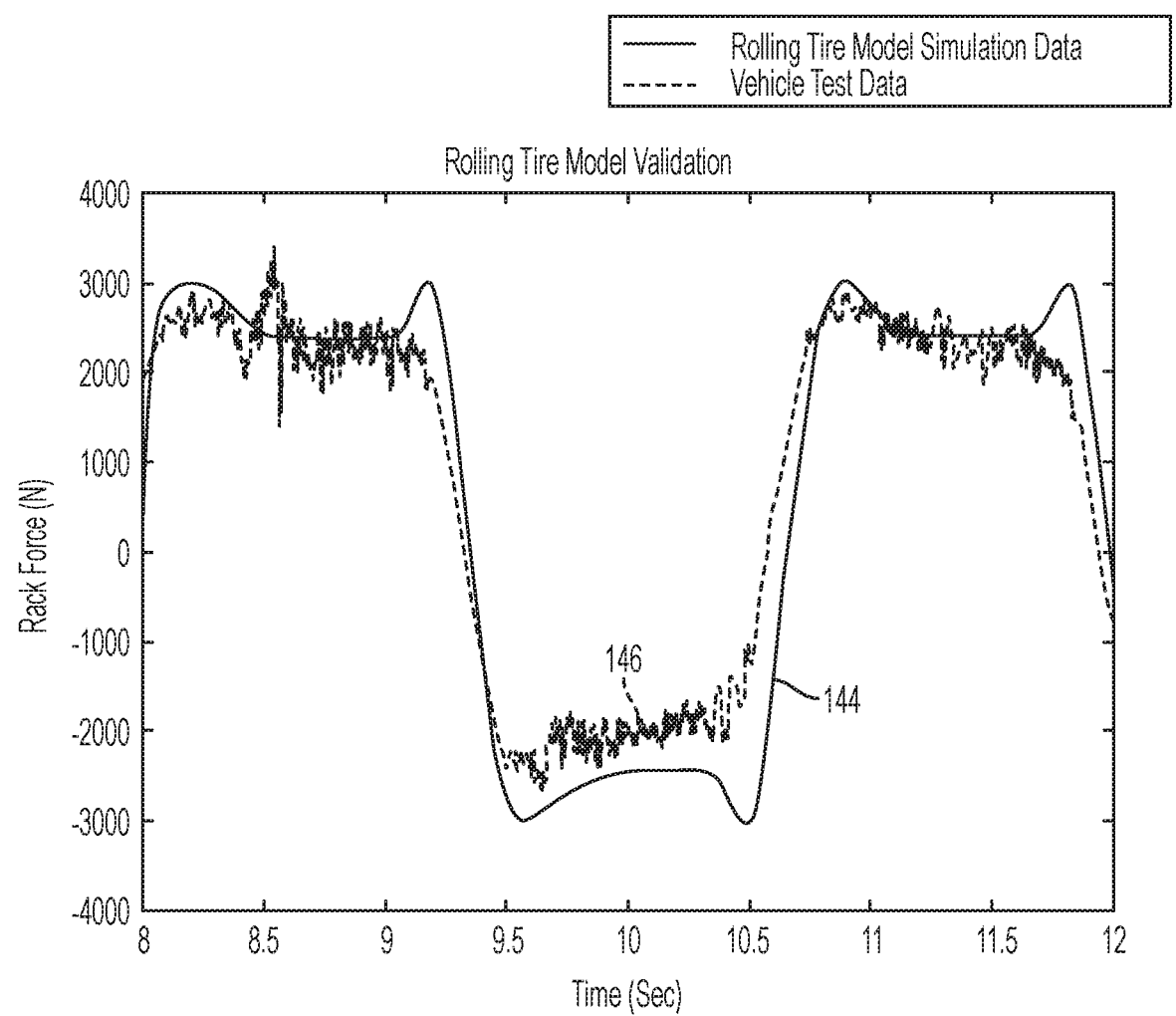
FIG. 12 depicts an example of simulation results based on a rolling tire model according to embodiments described herein.

FIG. 11 shows an example of rack force data estimated according to embodiments described herein. In this example, rack force predictions from a static tire model simulation result are shown by curve 140, and are compared to vehicle test data 142 collected on a dry surface. FIG. 12 shows an example of rack force data estimated according to embodiments described herein. In this example, rack force predictions from a rolling tire model simulation result are shown by curve 144, and are compared to vehicle test data 146. As shown, the polynomial based tire model is able to accurately predict the rack force.

Figure 13:
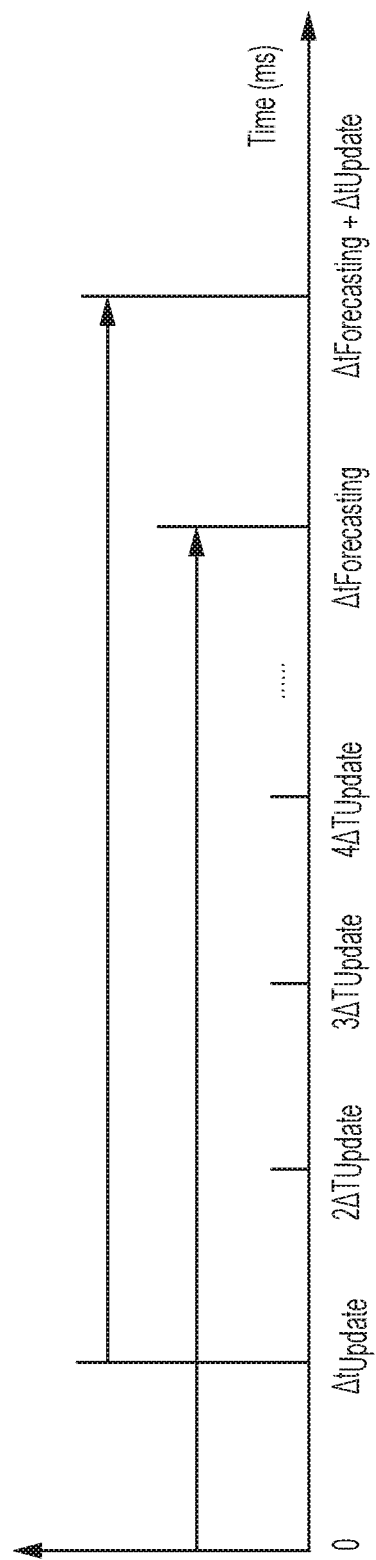
FIG. 13 depicts an example of time periods or intervals for which a forecasting function is called and for which forecasted or predicted system states are estimated.

FIG. 13 shows an example of time intervals or steps at which the system capability estimation and/or forecasting function can be performed. In this example, $\Delta t_{Forecasting}$ is defined as a forecasting time, or time from a measurement, sample or other selected time. The forecasting time may be defined as a time interval subsequent to a current or sample time.

In one embodiment, the system capability estimation and/or forecasting function is called every calibrate-able time period $\Delta t_{update}$. Then, this function predicts the system response at time $\Delta t_{Forecasting}$ by iteratively calculating system response in steps of sample time. Hence, the predicted response at time $\Delta t_{update} + \Delta t_{Forecasting}$ is estimated at current time step, say $\Delta t_{update}$. The iterative calculation may be achieved by an iteration technique such as a 'for-loop' technique, which may be executed in an embedded coder/controller. Since the algorithm is coded as an iterative algorithm in a 'for-loop', once it is called, 'for loop' will be executed for calibrate-able times to predict future system states such as predicted handwheel positions and limits at one or more calibrate-able times $\Delta t_{Forecasting}$ into the future. In other embodiments, if system capability is estimated immediately (e.g., at the current time zero or the next following time stamp $\Delta t_{update}$.

The system state (e.g., handwheel position) may be estimated using the model for a current time, or used to predict future system states. For example, if a range of future states is to be predicted, an iterative algorithm may be used to estimate system states for a series of time steps. Examples of algorithms that may be used for prediction include iterative methods such as Runge-Kutta method or Euler method.

Figure 14:
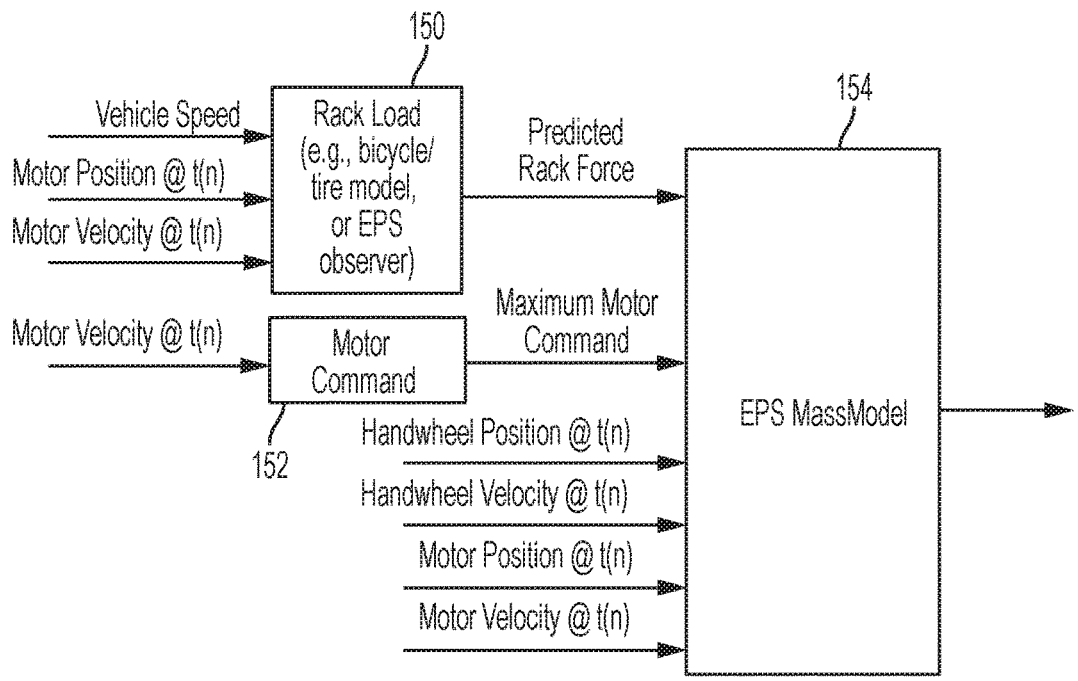
FIG. 14 depicts aspects of a method of estimating and/or forecasting a system state based on rack load estimations and a mass model of a steering system.

FIG. 14 shows an example of a mass model incorporated into the system state estimation and/or forecasting method. A rack load estimation module 150 receives input data such as vehicle speed, motor position, motor velocity and others, and outputs a current rack force (for the current time stamp or an immediately following time stamp) or a predicted rack force (for time stamp(s) subsequent to the current time stamp and/or the immediately following time stamp). The rack load estimation module 150 may utilize the tire models discussed above. A motor command module 152 outputs a motor command, which may be limited according to the motor envelope model discussed above. The rack force (current and/or predicted) and the motor command is input to a mass model 154, which estimates and/or predicts the system state, such as handwheel position.

Figure 15:
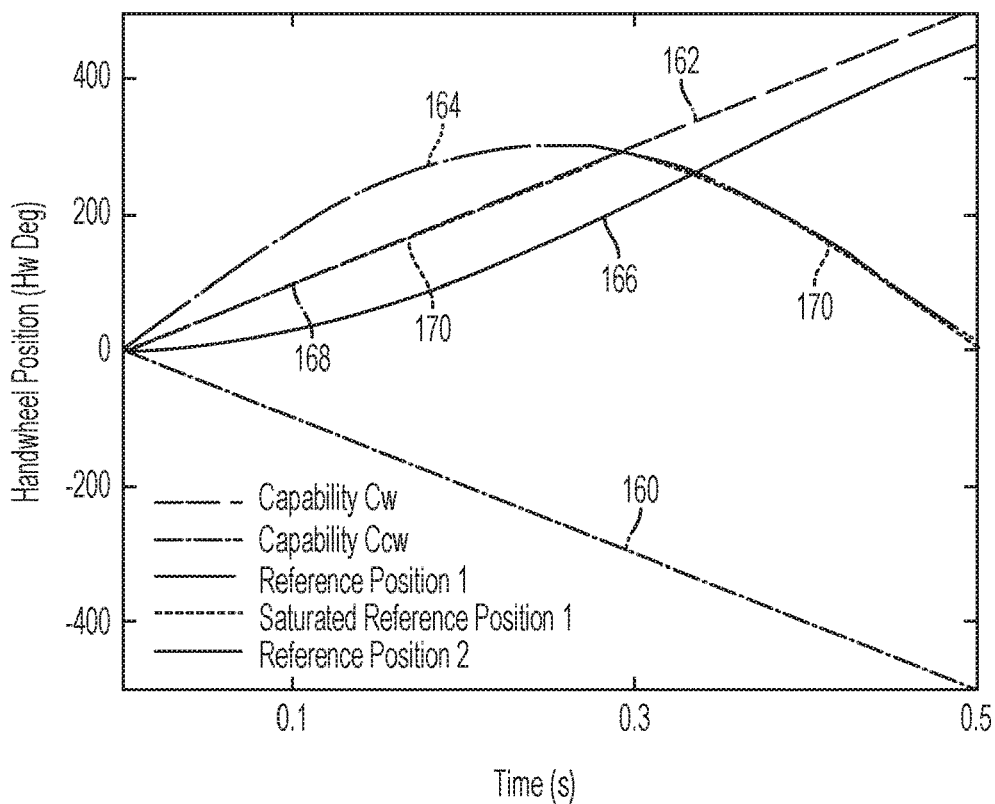
FIG. 15 depicts an example of forecasted handwheel position data generated according to embodiments described herein

FIG. 15 depicts an example of handwheel position forecasting data that can be generated based on embodiments discussed herein. The data in this example is a graph having a y-axis representing clockwise and counter-clockwise handwheel position in degrees, and an x-axis representing time. The forecasting data includes a clockwise handwheel position limit 160 and a counter-clockwise handwheel position limit 162. The data can be used by a control system to determine whether a reference position command can be realized or needs to be updated.

For example, a control system generates a reference handwheel position command 164. Based on the current handwheel position, the handwheel position at a future time or times (e.g. one time step at 0.01 seconds after the current time, or multiple time step iterations) is calculated according to embodiments discussed herein and used to generate the limits 160 and 162. The reference command 164 in this example exceeds the control system capability, which indicates that it cannot be achieved. In contrast, a second handwheel reference command 166 is within the system capability, which indicates that it can be achieved. Due to the estimated control system capability, it can be determined whether a reference position command can be achieved, e.g., by applying the limits and the reference position command to the reference command conditioning module 62 shown in FIG. 1, and the control system can decide whether the reference position command should be updated (e.g. from the reference position command 164 to a saturated reference position command 170).

In one embodiment, system states and capabilities can be calculated immediately (e.g., at a current time step or an immediately following time step) and/or at future time steps. For example, the method can include forecasting handwheel position in the future, and can also include estimating the maximum achievable motor torque or handwheel velocity immediately.

In the following example, future system state predictions such as predicted handwheel positions are generated using the Runge-Kutta algorithm to solve a set of ordinary differential equations (ODEs) to predict the range of handwheel position in the future. The algorithm is coded as an iterative algorithm such as a 'for-loop' algorithm.

Execution of the Runge-Kutta algorithm is discussed as follows in a general sense. When the algorithm is used for EPS control, the dynamic system includes the motor envelope model, rack load model, and mass model. Consider solving a general ordinary differential equation with initial condition:

$$\dot{y} = f(t, y), y(t_0) = y_0$$

where y is a function of time t and $\dot{y}$ is the derivative of y with respect to t. The Runge-Kutta is used to obtain an approximated solution, which is a sequence for n=0, 1, 2, 3 ..., as follows:

$$y_{n+1} = y_n + \frac{h}{6}(k_1 + 2k_2 + 2k_3 + k_4)$$

$$t_{n+1} = t_n + h$$

where $$k_1 = f(t_n, y_n),$$

$$k_2 = f\left(t_n + \frac{h}{2}, y_n + \frac{h}{2}k_1\right),$$

$$k_3 = f\left(t_n + \frac{h}{2}, y_n + \frac{h}{2}k_2\right),$$

$$k_4 = f(t_n + h, y_n + hk_3).$$

h is a time interval or time value, $k_1$ (or K1) is the increment based on the slope at the beginning of the interval y, $k_2$ (or K2) is the increment based on the slope at the midpoint of the interval y+0.5*h*K1. $K_3$ (or K3) is also the increment based on the slope at the midpoint of the interval y+0.5*h*K2, and $k_4$ (or K4) is the increment based on the slope at the end of the interval y+h*K3

Figure 16:
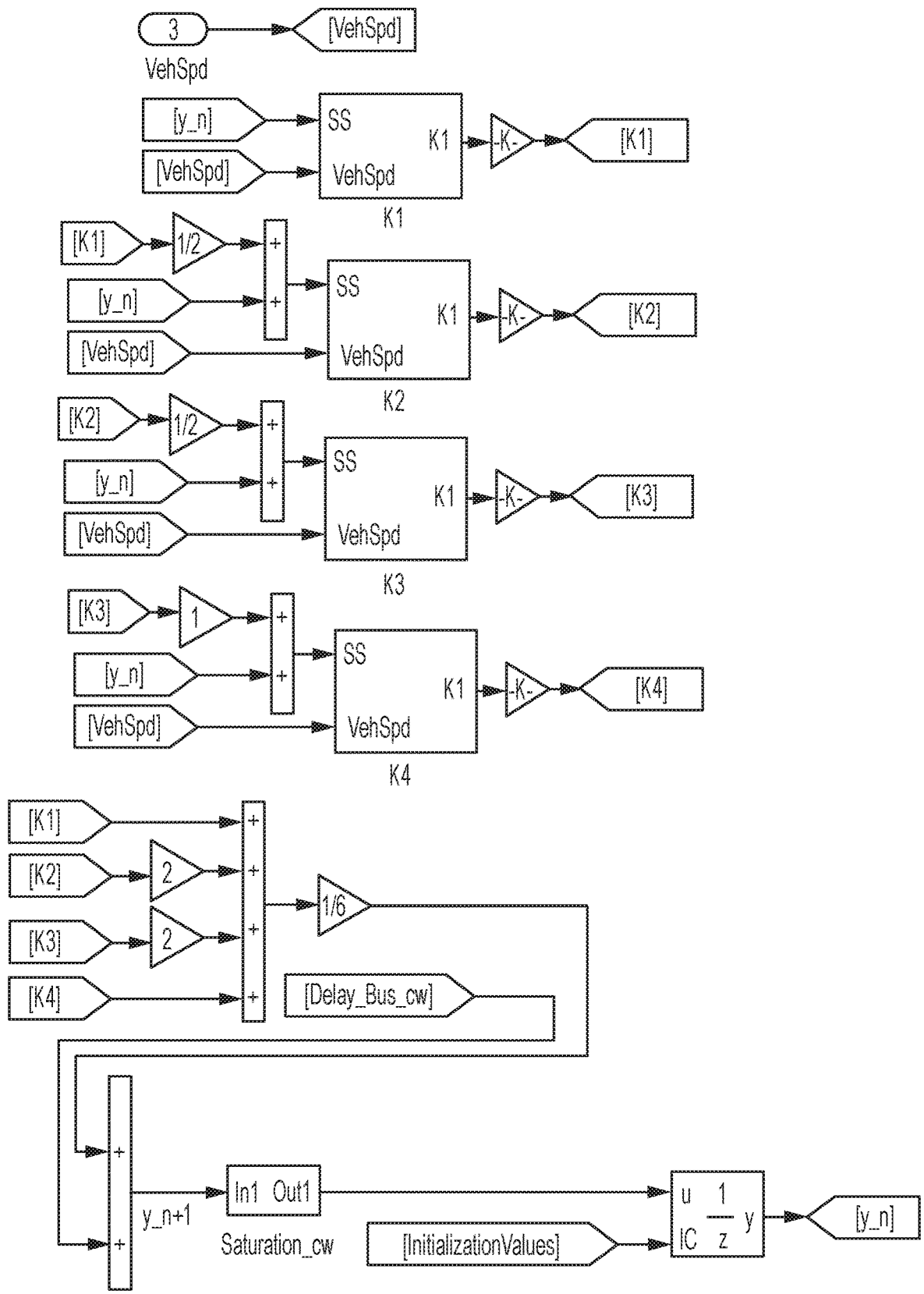
FIG. 16 depicts an embodiment of an algorithm used in a control method that includes forecasting a future system state.

In one embodiment, $y_n$ is a set of variables including handwheel position, handwheel velocity, rack position and rack velocity. FIG. 16 shows how the Runge-Kutta Algorithm is used to predict $y_{n+1}$ in Forecasting Function.

Figure 17:
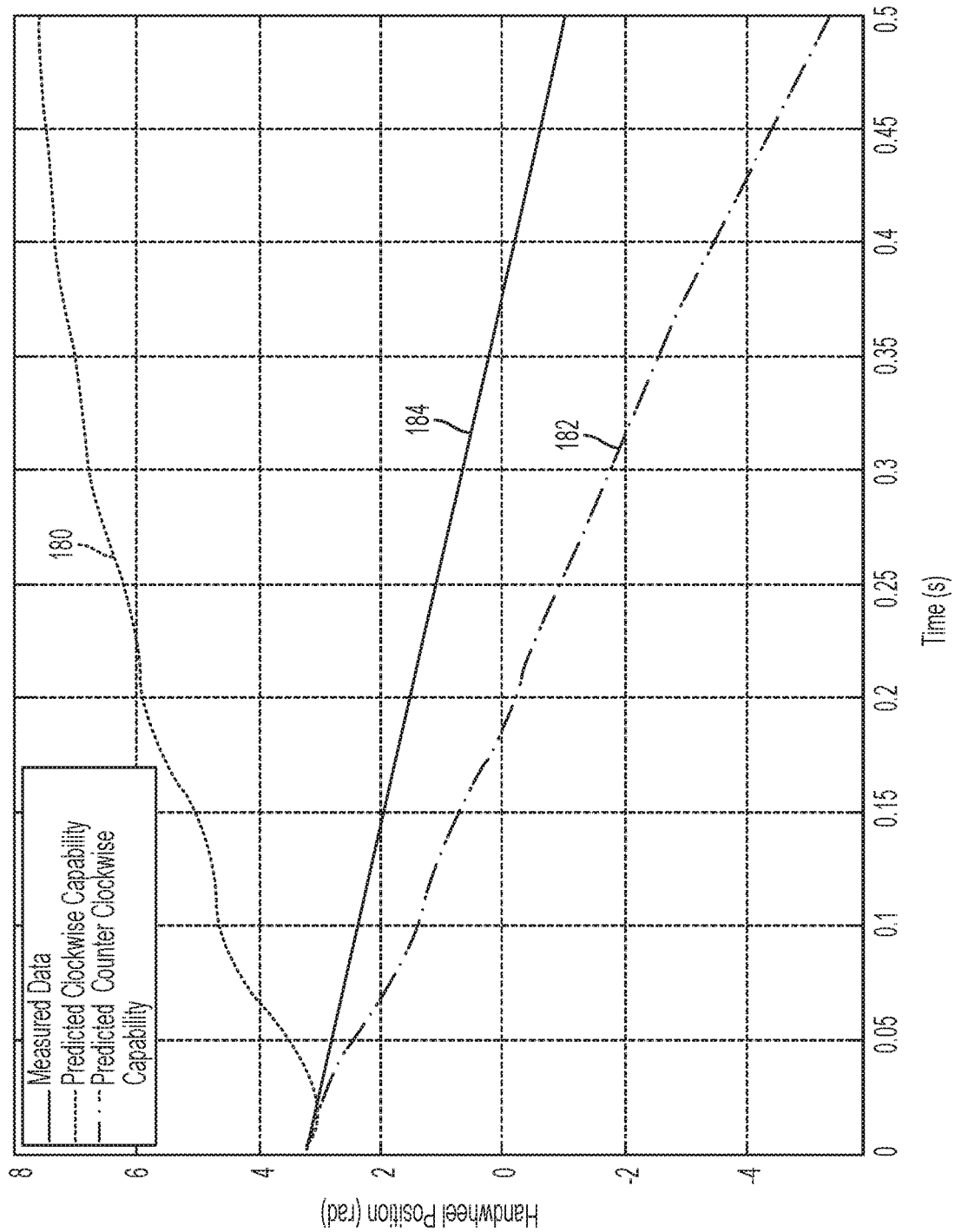
FIG. 17 depicts an example of forecasted handwheel position data generated according to an embodiment of a method of forecasting system states.

FIG. 17 illustrates an example of predicted clockwise and counter clockwise handwheel position limits estimated according to embodiments described herein. In this example, a vehicle test was collected while a driver was driving vehicle for some maneuver. The handwheel position was collected for 500 milliseconds. The handwheel position and handwheel velocity at time 0 are used as initial conditions to predict the maximum achievable handwheel position in the future 500 milliseconds using the forecasting model. FIG. 17 shows forecasted maximum handwheel position (curve 180 for clockwise and curve 182 for counter clockwise) and measured handwheel position (curve 184). Curve 180 shows the maximum angle that can be reached in clockwise direction within the forecasted time, and curve 182 shows the maximum angle that can be reached in the counter clockwise direction. As shown in this example, the measurement data is less than clockwise forecasting data and higher than counter clockwise forecasting data.

The following is an example of a method for forecasting or predicting a system state, which incorporates a one-mass model of an EPS assist mechanism and an EPS observer for estimating rack load. The one mass model may be a one degree of freedom mass-spring-damping system where the handwheel is represented as the mass. In this example, the rack load is estimated for a current or immediately following time stamp.

The equation of motion for the one-mass EPS model of an assist mechanism can be expressed as:

$$J_A \ddot{\theta}_A = T_M - T_F - T_b - T_R,$$

where $J_A$ is the inertia of the assist mechanism (AM), $\ddot{\theta}_A$ is the angular acceleration of the AM, $T_M$ is the motor torque acting on the AM, $T_F$ is the torque due to friction, $T_b$ is the torsion bar torque, and $T_R$ is the torque on the AM generated by the rack load. $T_M$ and $T_b$ can be measured, and $T_F$ can be modeled. The combination of $T_M$, $T_F$ and $T_b$ can be combined as a measured torque T, where $T = T_M - T_F - T_b$. In addition, $\dot{\theta}_A$ can be measured. Then, an observer can estimate $T_R$ using the measured T and $\dot{\theta}_A$.

The equation for the EPS observer can be expressed as follows:

$$\dot{x}_e = \bar{A} x_e + \bar{B} \begin{bmatrix} T \\ \dot{\theta}_A \end{bmatrix},$$

$$T_R = [0\ 1] x_e$$

where $x_e$ is a system state. The values $\bar{A}$ and $\bar{B}$ can be tuned such that $T_R$ can approximate the true torque on the AM generated by the rack load. The rack load can then be input to the one-mass model to estimate handwheel position, handwheel speed.

Figure 18:
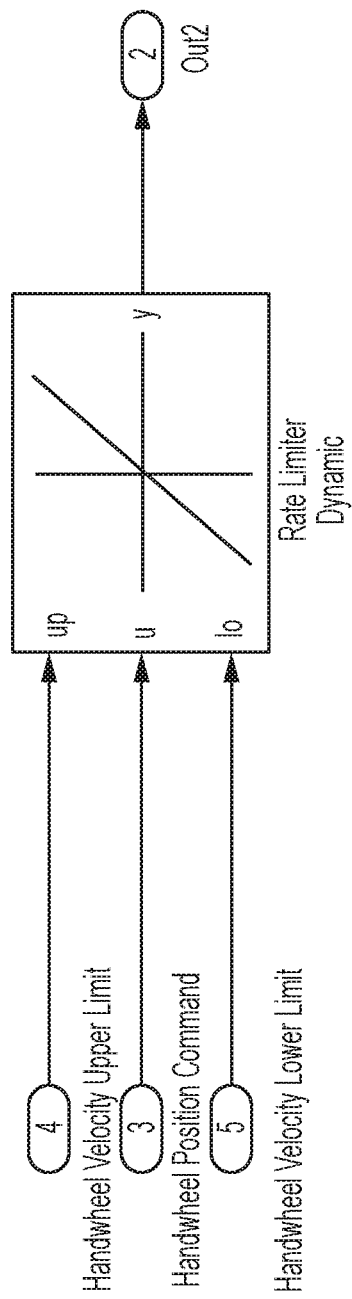
FIG. 18 depicts an example of a reference command conditioning module configured to condition or limit a handwheel position command.

An example of the calculation of handwheel velocity limits is shown as follows:
Upper Limit=Estimated maximum handwheel velocity state
Lower Limit=Estimated minimum handwheel velocity state For example, as shown in FIG. 2, a reference handwheel position and maximum handwheel position from the module 60 are input to the reference position conditioning block 62, which conditions the reference handwheel position via a rate limiter. An example of a rate limiter is shown in FIG. 18, which limits a handwheel position command based on the handwheel maximum velocity. The upper and lower velocity limits are shaped by forecasting function outputs from the system output capability module 60 (forecasting maximum clockwise and counterclockwise handwheel position). The conditioned reference position and a measured handwheel position is output to a servo and a steering motor or other component of a steering system to affect control of the vehicle.

Estimated maximum motor torque can be provided immediately from the motor torque envelope model. The estimated maximum motor torque may also be estimated for future time steps, e.g., by solving a set of ODEs as discussed above. Motor torque commands can be limited based on the maximum motor torque.

Figure 19:
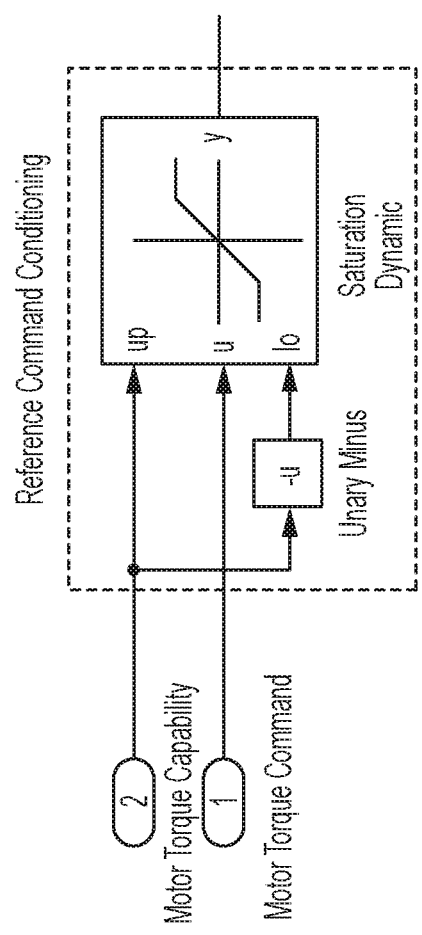
FIG. 19 depicts an example of a reference command conditioning module configured to condition or limit a motor torque command.

In another example, the vehicle control module 58 outputs a steering reference command representing a motor torque command rather than a reference handwheel position. The system output capability module 60 calculates a motor torque limit and sends it to the module 62, and a motor torque command is limited. An example of a limiter is shown in FIG. 19, which uses a saturation dynamic limiter to maintain the motor torque command to within limits set based on the maximum motor torque.

The system state estimations and/or forecasts can be used by or in conjunction with a vehicle control system to limit or condition a reference command (e.g., a handwheel position reference command or motor torque command) to ensure that the reference command stays within system capabilities.

It is noted that the system capability can be output to the reference condition module 62 (or other suitable limiting device) for a single time step or for multiple time step iterations. This can be useful, e.g., when predicting the EPS system capability for several time step iterations is computationally expensive.

Embodiments described herein provide a number of benefits and technical effects. Embodiments provide effective techniques for forecasting or predicting steering system and steering control and/or assist system states, which can be used to affect motor control and/or vehicle control.

With advances in motor control and other technologies, EPS systems have much higher bandwidth than before. However, the time response of an EPS system is still greatly affected by inertia and stiffness of the system. Furthermore, the instantaneous tire stiffness can change as a function of conditions such as surface friction, payload, slip angle, etc. This would also affect directional control of a vehicle. Previous position control algorithms can use a rate limiter to limit the rate of change of a position reference input. However, these rate limits are just simple calibrations and are not fully representative of limitations of an EPS system in a given scenario. Embodiments described herein provide functions such as forecasting a maximum angle that can be achieved in a calibrate-able time into the future, which can be used to condition the reference position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:
1. A method of controlling one or more components of a vehicle, comprising:
receiving a reference steering command and one or more measurement signals related to a steering system;
forecasting, by a processing device, a future state of the steering system, at at least one future time subsequent to a time of the receiving the one or more measurement signals, based on the one or more measurement signals, the future state being calculated using an estimated rack force and a mass model of the steering system, and the rack force being calculated using a rack force model; and controlling, by a control module, the steering system based on the steering reference command and the future state.

2. The method of claim 1, wherein the future state of the steering system comprises a maximum state achievable by the steering system at the at least one future time.

3. The method of claim 2, wherein controlling includes limiting a command generated by a steering control system based on the maximum state.

4. The method of claim 2, wherein the steering system comprises at least a handwheel, and the maximum state comprises a maximum achievable handwheel position.

5. The method of claim 2, wherein the steering system comprises at least a steering motor, and the maximum state comprises a maximum achievable motor torque of the steering motor.

6. The method of claim 1, wherein the one or more measurement signals include at least one of a motor position and a motor velocity.

7. The method of claim 1, wherein the rack force model includes a bicycle model and a static tire model, and the rack force is a blended rack force which is a blend of a rolling rack force estimated based on the bicycle model and a static rack force estimated based on the static tire model.

8. The method of claim 1, wherein the rack force is estimated based on a state observer in combination with a mass model of the system.

9. The method of claim 8, wherein the mass model is a one-mass model.

10. The method of claim 1, wherein the forecasting the future state comprises iteratively estimating the future state for each of one or more successive time steps, based on a set of differential equations derived from the mass model.

11. The method of claim 1, further comprising receiving a motor torque command, estimating a motor torque envelope based on motor parameters including voltage and thermal limits of the motor, and limiting the motor torque command based on the motor torque envelope.

12. A control system, comprising:
a processing device configured to:
receive a reference steering command and one or more measurement signals related to a steering system,
forecast a future state of the steering system, at at least one future time subsequent to a time of the receiving the one or more measurement signals, based on the one or more measurement signals; and a control module configured to control the steering system based on the steering reference command and the future state; and wherein the processing device is configured to calculate the future state based on an estimated rack force and a mass model of the steering system, the estimated rack force being calculated using a rack force model.

13. The system of claim 12, wherein the future state of the steering system comprises a maximum state achievable by the steering system at the at least one future time.

14. The system of claim 13, wherein the control module is configured to
limit a command generated by a steering control system based on the maximum state.

15. The system of claim 13, wherein the steering system comprises at least a handwheel, and the maximum state comprises a maximum achievable handwheel position.

16. The system of claim 13, wherein the steering system comprises at least a steering motor, and the maximum state comprises a maximum achievable motor torque of the steering motor.

17. The system of claim 12, wherein the one or more measurement signals include at least one of a motor position and a motor velocity.

18. The system of claim 12, wherein:
the rack force model includes a bicycle model and a static tire model,
the rack force is a blended rack force which is a blend of a rolling rack force estimated based on the bicycle model and a static rack force estimated based on the static tire model.

19. The system of claim 12, wherein the rack force is estimated based on a state observer in combination with a mass model of the system.

20. The system of claim 19, wherein the mass model is a one-mass model.

21. The system of claim 12, wherein the processing device is configured forecast the future state by iteratively estimating the future state for each of one or more successive time steps, based on a set of differential equations derived from the mass model.

22. The system of claim 12, wherein the processing device is further configured to receive a motor torque command, estimate a motor torque envelope based on motor parameters including voltage and thermal limits of the motor, and limit the motor torque command based on the motor torque envelope.

* * * * *